(12) United States Patent
Iyer

(10) Patent No.: US 11,025,501 B1
(45) Date of Patent: Jun. 1, 2021

(54) METHOD AND SYSTEM FOR PROVIDING SEAMLESS CONNECTIVITY IN AN INTERNET OF THINGS (IOT) NETWORK

(71) Applicant: Wipro Limited, Bangalore (IN)

(72) Inventor: Manjunath Ramachandra Iyer, Bangalore (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 16/833,698

(22) Filed: Mar. 30, 2020

(30) Foreign Application Priority Data

Feb. 14, 2020 (IN) .............................. 202041006589

(51) Int. Cl.
| | |
|---|---|
| *G06F 15/173* | (2006.01) |
| *H04L 12/24* | (2006.01) |
| *H04L 12/26* | (2006.01) |
| *H04L 12/861* | (2013.01) |
| *H04L 29/08* | (2006.01) |
| *G16Y 10/75* | (2020.01) |

(52) U.S. Cl.
CPC ........ *H04L 41/147* (2013.01); *H04L 43/0811* (2013.01); *H04L 49/90* (2013.01); *H04L 67/12* (2013.01); *G16Y 10/75* (2020.01)

(58) Field of Classification Search
CPC ... H04L 41/147; H04L 43/0811; H04L 49/90; H04L 67/12; G16Y 10/75
USPC ................................ 709/223, 224, 226, 229
See application file for complete search history.

(56) References Cited

U.S. PATENT DOCUMENTS

| | | | | |
|---|---|---|---|---|
| 9,692,498 | B2 * | 6/2017 | Fan ........................ | H04W 4/023 |
| 10,389,432 | B2 * | 8/2019 | De Rosa .............. | G08G 5/0039 |
| 2003/0105855 | A1 * | 6/2003 | Wynnyk ................ | H04L 12/14 |
| | | | | 709/224 |
| 2016/0276874 | A1 * | 9/2016 | Vivian Raya ......... | H02J 50/001 |
| 2017/0111102 | A1 * | 4/2017 | Fan ..................... | H04B 7/18504 |

(Continued)

FOREIGN PATENT DOCUMENTS

KR    2015129600 A    11/2015

OTHER PUBLICATIONS

Yuhao Gao et al., "Realization of Mobility-Controlled Flying Router in Information-Centric Networking", Journal of Communications and Networks, vol. 20, No. 5, Oct. 2018, pp. 443-451 (Year: 2018).*

*Primary Examiner* — Liang Che A Wang

(74) *Attorney, Agent, or Firm* — Finnegan, Henderson, Farabow, Garrett & Dunner, LLP

(57) ABSTRACT

Disclosed subject matter relates to field of Internet of Things (IoT) that performs a method and system for providing seamless connectivity in an IoT network. A router deployment system receives input data from input sources, comprising at least one of wireless routers and IoT devices, connected in an IoT network. Further, the router deployment system may predict intensity of data traffic at each wireless router based on the input data and may estimate a need for relocating at least one portable router based on intensity of data traffic at each wireless router. Thereafter, the router deployment system may relocate the at least one portable router to a target location for providing seamless connectivity in the IoT network. The present disclosure reduces load on wireless routers and waiting time for transmitting data via wireless routers by dynamically deploying portable routers for providing necessary bandwidth and accessibility, as per requirement.

15 Claims, 8 Drawing Sheets

(56) References Cited

U.S. PATENT DOCUMENTS

2018/0343587 A1\* 11/2018 Condeixa .............. H04W 4/027
2018/0375568 A1\* 12/2018 De Rosa ............... H04W 72/04
2020/0053757 A1\* 2/2020 Bagheri ................ H04L 5/0035
2020/0128359 A1\* 4/2020 Patil ................... H04B 7/18504

\* cited by examiner

METHOD AND SYSTEM FOR PROVIDING SEAMLESS CONNECTIVITY IN AN INTERNET OF THINGS (IOT) NETWORK

TECHNICAL FIELD

The present subject matter relates generally to the field of Internet of Things (IoT), and more particularly, but not exclusively to a method and a system for providing seamless connectivity in an IoT network.

BACKGROUND

Nowadays, with increase in number of IoT devices in the market and their capabilities, the quantum of data getting exchanged has increased multifold. For instance, a typical manufacturing plant comprises thousands of IoT devices. Although, these IoT devices transfer small data intermittently, multiple IoT devices would be trying to access the network at the same time, which results in congestion. Such congestion not only causes loss of data, but also disables the IoT devices from transferring data. Further, the congestion may not allow the routers to process the data which is received from the IoT devices, which leads to failure in generating response signals at the right time, thereby resulting in catastrophes in the networking environment.

Moreover, advancements in the field of IoT demand development of new standards such as 5G to enable connectivity and near real-time transactions over the Internet with a stringent constraint on delay. Currently, to meet such demands, the IoT devices tend to access Internet by connecting with another mobile device or a nearby router to transfer the data. The routers generally form a mesh or a grid to enable the IoT devices to access Internet and connect with other devices. As an example, the IoT devices fixed to moving vehicles form a network with the IoT devices fixed to other nearby vehicles as well as fixed routers established along the route of the moving vehicles. However, support provided by mesh network for network access, largely depends on the presence of other nearby vehicles, which makes the support volatile. Also, such mesh network or grid network would possess limited bandwidth capabilities when many moving vehicles are concentrated in a region, resulting in congestion.

Another issue faced with the wireless routers in an IoT network is uneven distribution of load. In some instances, some wireless routers may be overloaded while other wireless routers may be underutilized depending on presence or absence of the IoT devices using them for connectivity. The fixed infrastructure i.e. network of fixed routers may not be able to completely account for dynamic concentration of IoT devices that require network access. In addition, the fixed infrastructure could be underutilized or overutilized depending on factors such as the direction of traffic of moving vehicles, that fluctuate during different times of the day.

Some of the existing techniques provide a method to deploy drones to ensure good connectivity, when a device is unable to get required link strength. However, ensuring good connectivity for a certain device cannot account for dynamic concentration of IoT devices that require network access, in a volatile network such as Vehicular Ad hoc Network (VANET). Some other existing techniques disclose methods of deploying drones to form an ad-hoc network during occurrence of natural calamities such as earthquake, for providing network access. However, these techniques are conditional only to certain situations such as natural calamities which also fail to account for dynamic concentration of IoT devices that require network access.

Currently, there is no mechanism to cater for dynamic variations in concentration of IoT devices that require network access, especially in the volatile network, apart from the fixed infrastructure.

The information disclosed in this background of the disclosure section is only for enhancement of understanding of the general background of the disclosure and should not be taken as an acknowledgement or any form of suggestion that this information forms prior art already known to a person skilled in the art.

SUMMARY

Disclosed herein is a method of providing seamless connectivity in an Internet of Things (IoT) network. The method includes receiving, by a router deployment system input data from a plurality of input sources connected in an IoT network. The plurality of input sources comprises at least one of a plurality of wireless routers and a plurality of IoT devices. Further, the plurality of wireless routers comprises at least one of a plurality of fixed routers and a plurality of portable routers. Upon receiving the input data, the method includes predicting an intensity of data traffic at each wireless router of the plurality of wireless routers based on total data to be directed by each wireless router, holding time of each of the plurality of input sources, a rate of arrival of data packets from each of the plurality of input sources, and unused buffer space of a buffer associated with each of the plurality of wireless routers. Further, the method includes estimating a need for relocating at least one portable router of the plurality of portable routers, based on the intensity of data traffic at each of the plurality of wireless routers. Finally, the method includes relocating the at least one portable router to a target location for providing a seamless connectivity in the IoT network. The target location is determined based on a location of at least one wireless router at which the intensity of data traffic exceeds at least one of a predefined load threshold and a predefined buffer filling rate threshold, and a location of each of the plurality of input sources connected to the at least one wireless router.

Further, the present disclosure includes a router deployment system for providing seamless connectivity in an Internet of Things (IoT) network. The router deployment system includes a processor and a memory communicatively coupled to the processor. The memory stores the processor-executable instructions, which, on execution, causes the processor to receive input data from a plurality of input sources connected in an IoT network. The plurality of input sources comprises at least one of a plurality of wireless routers and a plurality of IoT devices. Further, the plurality of wireless routers comprises at least one of a plurality of fixed routers and a plurality of portable routers. Upon receiving the input data, the processor predicts an intensity of data traffic at each wireless router of the plurality of wireless routers based on total data to be directed by each wireless router, holding time of each of the plurality of input sources, a rate of arrival of data packets from each of the plurality of input sources, and unused buffer space of a buffer associated with each of the plurality of wireless routers. Further, the processor estimates a need for relocating at least one portable router of the plurality of portable routers, based on the intensity of data traffic at each of the plurality of wireless routers. Finally, the processor relocates the at least one portable router to a target location for providing a seamless connectivity in the IoT network. The target location is determined based on a location of at least one wireless router at which the intensity of data traffic exceeds at least one of a predefined load threshold and a predefined buffer filling rate threshold, and a location of each of the plurality of input sources connected to the at least one wireless router.

Furthermore, the present disclosure includes a non-transitory computer readable medium including instructions stored thereon that when processed by at least one processor causes a router deployment system to perform operations comprising, receiving input data from a plurality of input sources connected in an IoT network. The plurality of input sources comprises at least one of a plurality of wireless routers and a plurality of IoT devices. The plurality of wireless routers comprises at least one of a plurality of fixed routers and a plurality of portable routers. Further, the instructions cause the processor to predict an intensity of data traffic at each wireless router of the plurality of wireless routers based on total data to be directed by each wireless router, holding time of each of the plurality of input sources, a rate of arrival of data packets from each of the plurality of input sources, and unused buffer space of a buffer associated with each of the plurality of wireless routers. Furthermore, the instructions cause the processor to estimate a need for relocating at least one portable router of the plurality of portable routers, based on the intensity of data traffic at each of the plurality of wireless routers. Furthermore, the instructions cause the processor to relocate the at least one portable router to a target location for providing a seamless connectivity in the IoT network, wherein the target location is determined based on a location of at least one wireless router at which the intensity of data traffic exceeds at least one of a predefined load threshold and a predefined buffer filling rate threshold, and a location of each of the plurality of input sources connected to the at least one wireless router.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DIAGRAMS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1:
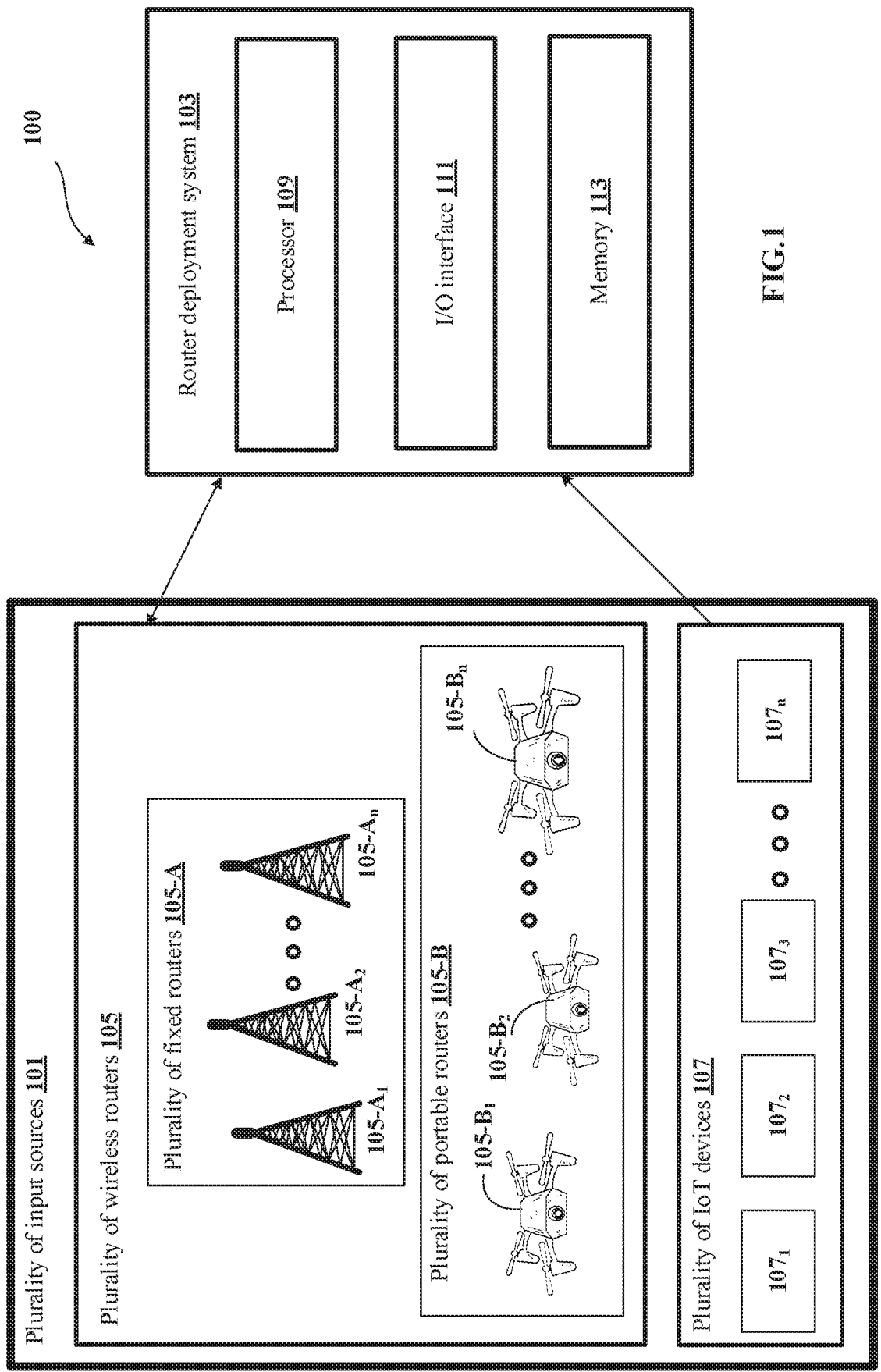
FIG. 1 shows an exemplary architecture for providing seamless connectivity in an Internet of Things (IoT) network in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the scope of the disclosure.

The terms "comprises", "comprising", "includes" or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

Disclosed herein are a method and a system for providing seamless connectivity in an Internet of Things (IoT) network. In one embodiment, the present disclosure addresses the problem of accounting for dynamic concentration of IoT devices that require network access. For instance, when many IoT devices from a geo-spatial region attempt to access the Internet at a same time, there arises a need to provide additional bandwidth and accessibility for connectivity to that geo spatial region dynamically, such that, each of the IoT devices are given the opportunity to access the Internet for data transfer and to generate/receive real-time signals for critical applications. In another embodiment, the present disclosure provides support for one or more IoT devices which are out of network range, dynamically, which cannot be addressed by the fixed infrastructure in real-time.

A router deployment system disclosed in the present disclosure may initially receive input data from a plurality of input sources connected in an IoT network. In some embodiments, the plurality of input sources may include at least one of a plurality of wireless routers and a plurality of IoT devices. Further, in some embodiments, the plurality of wireless routers may include at least one of a plurality of fixed routers and a plurality of portable routers. Upon receiving the input data, the router deployment system may predict an intensity of data traffic at each wireless router of the plurality of wireless routers based on total data to be directed by each wireless router, holding time of each of the plurality of input sources, a rate of arrival of data packets from each of the plurality of input sources, and unused buffer space of a buffer associated with each of the plurality of wireless routers. Further, the router deployment system may estimate a need for relocating at least one portable router of the plurality of portable routers, based on the intensity of data traffic at each of the plurality of wireless routers. Based on the estimation, the router deployment system relocates the at least one portable router to a target location for providing a seamless connectivity in the IoT network. In some embodiments, the target location is determined based on a location of at least one wireless router at which the intensity of data traffic exceeds a predefined load threshold, a predefined buffer filling rate threshold, and a location of each of the plurality of input sources connected to the at least one wireless router.

The present disclosure ensures balanced utilization of the network resources by dynamically deploying portable routers, as per requirement, which in turn eliminates the over utilization or under utilization of the fixed or other portable routers. Further, the dynamic deployment of the portable routers is based on the intensity of data traffic at each of the wireless routers, which in turn helps in accounting for dynamic concentration of IoT devices in a certain location, requiring network access. Therefore, the present disclosure caters to the real-time networking requirements of the IoT devices. Additionally, the present disclosure predicts the intensity of data traffic at each of the wireless routers, based on current input data. This type of prediction enables futuristic decision making related to dynamic deployment of portable routers, to adaptively manage the load on the wireless routers, in real-time.

A description of an embodiment with several components in communication with each other does not imply that all such components are required. On the contrary, a variety of optional components are described to illustrate the wide variety of possible embodiments of the disclosure.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary architecture for providing seamless connectivity in an Internet of Things (IoT) network in accordance with some embodiments of the present disclosure.

The architecture 100 includes a plurality of input sources 101 and a router deployment system 103. The plurality of input sources 101 may include any source which contributes to data traffic or directs data in an IoT network. In some embodiments, the plurality of input sources 101 may include, but not limited to, wireless router $105_1$ to wireless router $105_n$ (collectively referred as a plurality of wireless routers 105) and IoT device $107_1$ to IoT device $107_n$ (collectively referred as a plurality of IoT devices 107). In some embodiments, the plurality of wireless routers 105 may further include, but not limited to, fixed router 105-$A_1$ to fixed router 105-$A_n$ (collectively referred as a plurality of fixed routers 105-A) and portable router 105-$B_1$ to portable router 105-$B_n$ (collectively referred as a plurality of portable routers 105-B). In some embodiments, the plurality of IoT devices 107 and the plurality of wireless routers 105 may be connected to form an IoT network. As an example, the IoT network may be implemented in the form of a wireless mesh network or a grid network.

The plurality of IoT devices 107 may transfer data via the plurality of wireless routers 105 based on their requirement and accessibility. As an example, the plurality of IoT devices 107 may include, but not limited to, sensors, mobile phones, smart wearable devices such as smart watches, smart appliances such as television, speakers, refrigerators and the like, monitoring devices, tracking devices, surveillance devices, and the like, which are capable of forming an IoT network. In some embodiments, the plurality of fixed routers 105-A may be initially deployed at certain locations based on pattern of traffic of moving vehicles. As an example, a location "ABC" may have high amount of traffic between 10 AM-3 PM in a day. Therefore, based on this pattern of traffic, a fixed router 105-A may be established in the location "ABC" to cater network requirement of the high amount of traffic in the location "ABC". In another example, a manufacturing plant or a technology park configured with numerous IoT devices 107 is situated in a location. Therefore, high amount of data traffic can be expected in such location due to transmission of data by each of the numerous IoT devices 107. Hence, fixed routers 105-A may be established in such location to cater network requirement of the numerous IoT devices 107. Further, in some embodiments, the plurality of portable routers 105-B may be deployed at different locations proximal to the deployment location of the plurality of fixed routers 105-A. The plurality of portable routers 105-B may be dynamically relocated to a target location based on intensity of data traffic at each of the plurality of wireless routers 105. In some embodiments, the plurality of portable routers 105-B may be detachably attached to an unmanned aerial vehicle i.e. the unmanned aerial vehicle may fetch the plurality of portable routers 105-B from one location and deploy in another location. In some other embodiments, the plurality of portable routers 105-B may be configured in the unmanned aerial vehicle. For instance, the plurality of portable routers 105-B may be fixed to the unmanned aerial vehicle. As an example, the unmanned aerial vehicle may include, but is not limited to, a drone. In some embodiments, the plurality of inputs sources 101 i.e. the plurality of wireless routers 105 and the plurality of IoT devices 107 may be associated with the router deployment system 103 via a communication network (not shown in the FIG. 1). In some embodiments, the communication network may be a wireless communication network.

The router deployment system 103 may include, a processor 109, an Input/Output (I/O) interface 111 and a memory 113. The I/O interface 111 may be configured to receive input data from the plurality of input sources 101. As an example, the input data may include, but not limited to, status of a buffer associated with each of the plurality of wireless routers 105 at a given time instance, rate of filling of the buffer associated with each of the plurality of wireless routers 105, number of the plurality of input sources 101 directing data through each of the plurality of wireless routers 105, holding time of each of the plurality of input sources 101, data rate corresponding to each of the plurality of input sources 101 and size of data transmitted by each of the plurality of input sources 101. Upon receiving the input data, the processor 109 may predict an intensity of data traffic at each wireless router 105 of the plurality of wireless routers 105. In some embodiments, the processor 109 may predict the intensity of data traffic based on total data to be directed by each wireless router 105, the holding time of each of the plurality of input sources 101, a rate of arrival of data packets (also referred as data rate in this disclosure) from each of the plurality of input sources 101, and unused buffer space of the buffer associated with each of the plurality of wireless routers 105.

Further, the processor 109 may estimate a need for relocating at least one portable router 105-B of the plurality of portable routers 105-B, based on the intensity of data traffic at each of the plurality of wireless routers 105. Based on the estimation, the processor 109 may relocate the at least one portable router 105-B to a target location for providing a seamless connectivity in the IoT network. In some embodiments, the processor 109 may determine the target location based on a location of at least one wireless router 105 at which the intensity of data traffic exceeds a predefined load threshold and a predefined buffer filling rate threshold, and a location of each of the plurality of input sources 101 connected to the at least one wireless router 105. In some embodiments, the processor 109 may determine an optimal relocation path for relocating the at least one portable router 105-B to the target location.

Figure 2A:
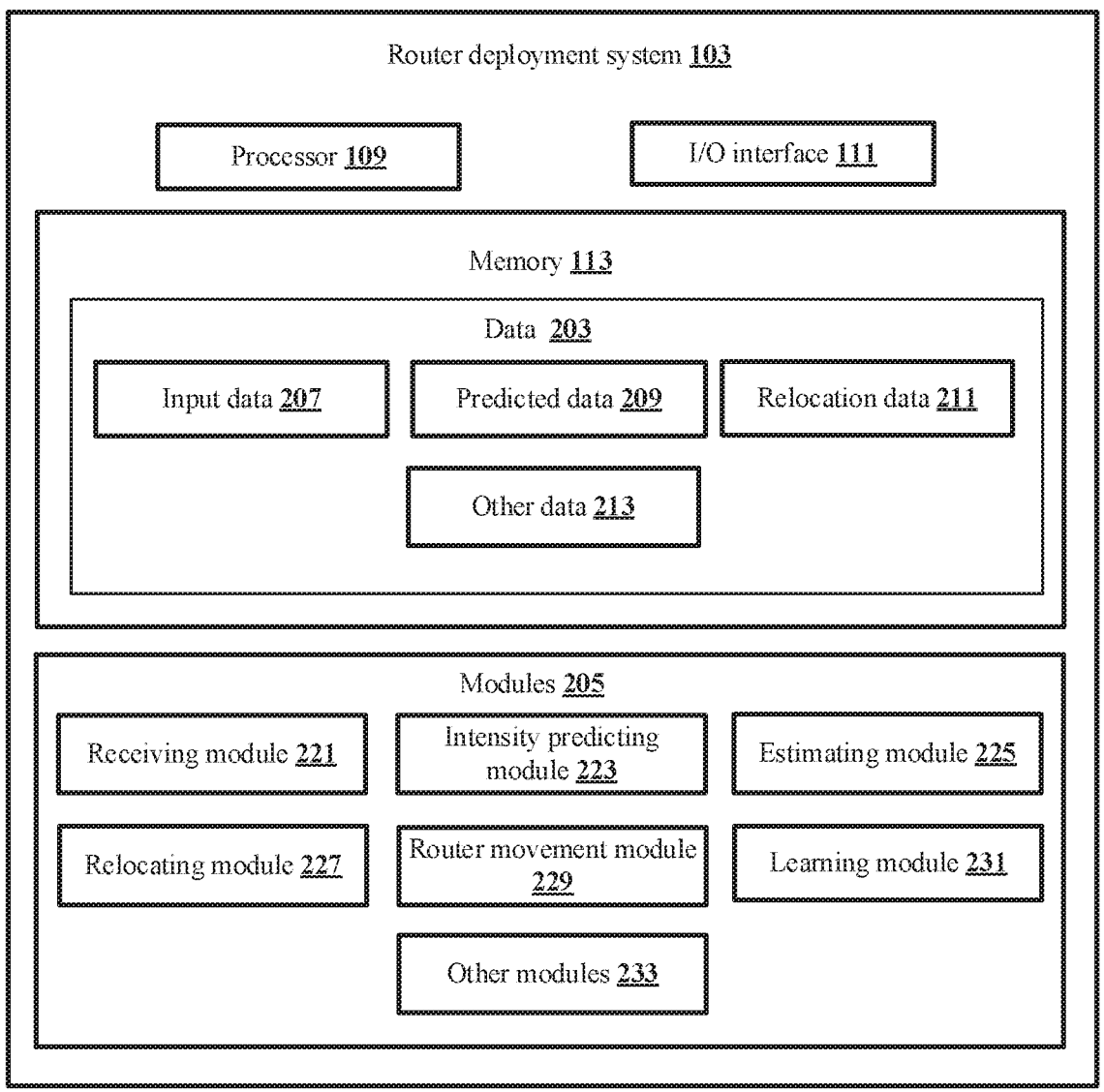
FIG. 2A shows a detailed block diagram of a router deployment system for providing seamless connectivity in an Internet of Things (IoT) network in accordance with some embodiments of the present disclosure.

FIG. 2A shows a detailed block diagram of a router deployment system for providing seamless connectivity in an Internet of Things (IoT) network in accordance with some embodiments of the present disclosure.

In some implementations, the router deployment system 103 may include data 203 and modules 205. As an example, the data 203 is stored in a memory 113 configured in the router deployment system 103 as shown in the FIG. 2A. In one embodiment, the data 203 may include input data 207, predicted data 209, relocation data 211 and other data 213. In the illustrated FIG. 2A, modules 205 are described herein in detail.

In some embodiments, the data 203 may be stored in the memory 113 in form of various data structures. Additionally, the data 203 can be organized using data models, such as relational or hierarchical data models. The other data 213 may store data, including temporary data and temporary files, generated by the modules 205 for performing the various functions of the router deployment system 103.

In some embodiments, the data 203 stored in the memory 113 may be processed by the modules 205 of the router deployment system 103. The modules 205 may be stored within the memory 113. In an example, the modules 205 communicatively coupled to the processor 109 configured in the router deployment system 103, may also be present outside the memory 113 as shown in FIG. 2A and implemented as hardware. As used herein, the term modules 205 may refer to an application specific integrated circuit (ASIC), an electronic circuit, a processor (shared, dedicated, or group) and memory that execute one or more software or firmware programs, a combinational logic circuit, and/or other suitable components that provide the described functionality.

In some embodiments, the modules 205 may include, for example, a receiving module 221, an intensity predicting module 223, an estimating module 225, a relocating module 227, a router movement module 229, a learning module 231 and other modules 233. The other modules 233 may be used to perform various miscellaneous functionalities of the router deployment system 103. It will be appreciated that such aforementioned modules 205 may be represented as a single module or a combination of different modules.

In some embodiments, the receiving module 221 may receive the input data 207 from a plurality of input sources 101 connected in an IoT network. As an example, the plurality of input sources 101 may include, but not limited to, a plurality of wireless routers 105 and a plurality of IoT devices 107. In some embodiments, the plurality of wireless routers 105 may include, but not limited to, a plurality of fixed routers 105-A and a plurality of portable routers 105-B. As an example, the input data 207 may include, but not limited to, status of a buffer associated with each of the plurality of wireless routers 105 at a given time instance, rate of filling of the buffer associated with each of the plurality of wireless routers 105, number of the plurality of input sources 101 directing data through each of the plurality of wireless routers 105, holding time of each of the plurality of input sources 101, data rate corresponding to each of the plurality of input sources 101 and size of data transmitted by each of the plurality of input sources 101.

Further, in some embodiments, the intensity predicting module 223 may predict an intensity of data traffic at each wireless router 105 of the plurality of wireless routers 105. Intensity of data traffic at each wireless router 105 indicates a probability of packet drop when the data packets are routed through the corresponding wireless router 105. In some embodiments, the intensity of data traffic is predicted based on total data to be directed by each wireless router 105, holding time of each of the plurality of input sources 101, a rate of arrival of data packets from each of the plurality of input sources 101, and unused buffer space of a buffer associated with each of the plurality of wireless routers 105. In some embodiments, the intensity predicting module 223 may determine unused buffer space of the buffer associated with each of the plurality of wireless routers 105 based on a relevance factor of each of the plurality of input sources 101 associated with the corresponding wireless router 105. The relevance factor of each input source 101 may indicate total buffer space required by the input source 101 to transmit the total data through the corresponding wireless router 105.

In some embodiments, the intensity predicting module 223 may determine the relevance factor of each input source 101 associated with the corresponding wireless router 105 using the below Equation 1.

$$RF(S_n) = [TD(S_n)/TD(B)] \qquad \text{Equation 1}$$

In the above Equation 1, $RF(S_n)$ indicates relevance factor of an input source $S_n$, where n=0, 1, 2 - - - n;

$TD(S_n)$ indicates total size of data to be transmitted by an input source $S_n$ through the wireless router 105; and $TD(B)$ indicates total buffer size of the buffer associated with the wireless router 105.

Thereafter, the intensity predicting module 223 may determine the unused buffer space of the buffer associated with each of the plurality of wireless routers 105 using the below Equation 2.

$$\text{Unused buffer space of the buffer} = RF(S_1) + RF(S_2) + \text{ - - - } RF(S_n) \qquad \text{Equation 2}$$

In the above Equation 2,

"$RF(S_1)+RF(S_2)+$ - - - $RF(S_n)$" indicates sum of relevance factor of each input source 101 associated with the corresponding wireless router 105.

In some embodiments, the sum of relevance factor of each of the plurality of input sources 101 associated with the wireless router 105 should be less than 1. When the sum of relevance factors is equal to 1, the intensity predicting module 223 may infer that the buffer space of the buffer associated with the wireless router 105 is completely occupied. When the sum of relevance factors is less than 1 but close to 1, for instance, when relevance factor is greater than 0.6, the intensity predicting module 223 may infer that the buffer space of the buffer associated with the wireless router 105 is fast filling i.e. the corresponding wireless router may be considered to be approaching a state of being overloaded. When the sum of the relevance factor is less than 1, for instance, less than or equal to 0.6, the intensity predicting module 223 may infer that the buffer space of the buffer associated with the wireless router 105 is less occupied.

Therefore, based on the total data to be directed by each wireless router 105, holding time of each of the plurality of input sources 101, a rate of arrival of data packets from each of the plurality of input sources 101, and unused buffer space of the buffer associated with each of the plurality of wireless routers 105, the intensity predicting module 223 may predict the intensity of data traffic at each of the plurality of wireless routers 105. The intensity of the data traffic predicted for each of the plurality of wireless routers 105 may be stored as the predicted data 209. In some embodiments, the intensity predicting module 223 may predict the intensity of data traffic using one or more machine learning techniques. As an example, the one or more machines learning techniques may include, but not limited to, Long Short Term Memory (LSTM) techniques and Multilayer perceptron techniques. Further, in some embodiments, the prediction of the intensity of data traffic is at least one of a location-wise prediction and a time-wise prediction.

Further, in some embodiments, the estimating module 225 may estimate a need for relocating at least one portable router 105-B of the plurality of portable routers 105-B, based on the intensity of data traffic at each of the plurality of wireless routers 105. The processor 109 may estimate the need for relocating the at least one portable router 105-B, when the intensity of data traffic at the plurality of wireless routers 105 exceeds either a predefined load threshold or a predefined buffer filling rate threshold associated with the corresponding wireless router 105.

In some embodiments, when the intensity of data traffic at the plurality of wireless routers 105 exceeds the predefined load threshold, the estimating module 225 may infer that the corresponding plurality of wireless routers 105 are overloaded and are incapable of handling additional load. In such scenarios, the corresponding plurality of wireless routers 105 may fail to function properly, for instance, may not be able to process data packets, may not be able to generate real-time signals at the right time, may delay transmission of the data packets and the like. To handle such scenarios, the estimating module 225 may estimate the need to relocate at least one portable router 105-B to share load of the plurality of wireless routers 105 at which the intensity of data traffic has exceeded the predefined load threshold.

In some embodiments, when the intensity of data traffic at the plurality of wireless routers 105 exceeds the predefined buffer filling rate threshold, the estimating module 225 may infer that the corresponding plurality of wireless routers 105 are potential overloaded routers. In such scenarios, the estimating module 225 may estimate the need to relocate at least one portable router 105-B to share load of the plurality of wireless routers 105 at which the intensity of data traffic has exceeded the predefined buffer filling rate threshold, before the potential overloaded routers reach the state of being overloaded.

Further, in some embodiments, the relocating module 227 may initially determine the at least one portable router 105-B among the plurality of portable routers 105-B to be relocated. In one embodiment, the relocating module 227 may determine the at least one portable router 105-B based on specification (capability) of the at least one portable router 105-B and a current location of the at least one portable router 105-B. In some embodiments, the specification of the plurality of portable routers 105-B may be different. The at least one portable router 105-B may be selected by verifying whether the specification of the at least one portable router 105-B is capable of handling the network requirement of the at least one wireless router 105. For instance, if the network requirement demands a data rate of 10 Mbps, then the relocating module 227 may determine at least one portable router 105-B among the plurality of portable routers 105-B which is capable of handling the data rate of 10 Mbps. Upon determining the at least one portable router 105-B to be relocated, the relocating module 227 may determine a target location for relocating the at least one portable router 105-B, when the need for relocating at least one portable router 105-B is estimated. In some embodiments, the relocating module 227 may determine the target location based on a location of the at least one wireless router 105 at which the intensity of data traffic exceeds at least the predefined load threshold and the predefined buffer filling rate threshold, and a location of each of the plurality of input sources 101 connected to the at least one wireless router 105. Generally, when the plurality of input sources 101 are re-routed from one wireless router 105 to another portable router 105-B, the re-routed plurality of input sources 101 may face reduction in signal strength, due to distance factor between the portable router 105-B and the re-routed plurality of input sources 101. Therefore, the relocating module 227 determines an optimal target location which ensures maintenance of signal strength even when the plurality of input sources 101 are re-routed from one wireless router 105 to another portable router 105-B. In some embodiments, the target location of the at least one portable router 105-B may be determined in a manner that, the at least one portable router 105-B may share the load of more than one wireless router 105. In some embodiments, when more than one portable router 105-B exist proximal to the at least one fixed router 105-A, then the relocating module 227 may determine a corresponding target location for each of these portable routers 105-B to ensure extraction of maximum network support from each of these portable routers 105-B. The relocating module 227 may determine the target location using one or more optimization techniques such as simulated annealing technique. In some embodiments, the target location may be in the form of latitude and longitude co-ordinates.

Upon determining the optimal target location, the relocating module 227 may determine an optimal relocation path for relocating the at least one portable router 105-B to the target location from a current location of the at least one portable router 105-B. In some embodiments, the relocating module 227 may employ one or more shortest path techniques to determine the optimal path to the target location. Thereafter, the relocating module 227 may transmit the relocation data 211 including the target location and the optimal path to the target location, to the at least one portable router 105-B, for relocating the at least one portable router 105-B from the current location to the target location.

Further, in some embodiments, the router movement module 229 may generate control signals in real-time to physically route the at least one portable router 105-B based on the relocation data 211. In some embodiments, the at least one portable router 105-B may be detachably attached to an unmanned aerial vehicle i.e. the unmanned aerial vehicle may fetch the at least one portable router 105-B from the current location and deploy in the target location. In some other embodiments, the at least one portable router 105-B may be configured in the unmanned aerial vehicle. For instance, the at least one portable router 105-B may be fixed to the unmanned aerial vehicle. As an example, the unmanned aerial vehicle may include, but not limited to, a drone. In some embodiments, the unmanned aerial vehicle relocating the at least one portable router 105-B may hover at the target location to provide network assistance to the at least one wireless router 105 at which the intensity of data traffic has exceeded a predefined load threshold or a predefined buffer filling rate threshold. In some other embodiments, the unmanned aerial vehicle may temporarily fix the portable router 105-B at a parking point proximal to the target location. As an example, the parking point may be a point on a structure such as a building, vehicle stranded in traffic, light post and the like, which can temporarily accommodate the at least one portable router 105-B.

Further, in some embodiments, the learning module 231 may initiate a self-learning process based on each relocation. In some embodiments, the learning module 231 may learn traffic patterns such as traffic volume of moving vehicles in different regions at different instances of time in a day, regions congested with high traffic volume, low traffic volume, moderate traffic volume of moving vehicles at different instances of time in a day and the like. In other embodiments, the self-learning process may be related to deployment of the plurality of portable routers 105-B. As an example, the learning module 231 may learn deployment positions such as parking points in various target locations, based on each relocation. In yet other embodiments, the self-learning process may be related to learning different locations where the transmission of data through the IoT devices 107 is high, such as manufacturing plants, tech parks and the like.

In some embodiments, the plurality of portable routers 105-B may be relocated to support plurality of fixed routers 105-A that are overloaded. In some other embodiments, the plurality of portable routers 105-B may be relocated to support the at least one relocated portable router 105-B that is overloaded. In yet other embodiments, the plurality of portable routers 105-B may be relocated to support the potential overloaded routers among the plurality of fixed routers 105-A and the plurality of portable routers 105-B.

Henceforth, the process of providing seamless connectivity in the IoT network is explained with the help of one or more examples for better understanding of the present disclosure. However, the one or more examples should not be considered as limitation of the present disclosure.

Figure 2B:
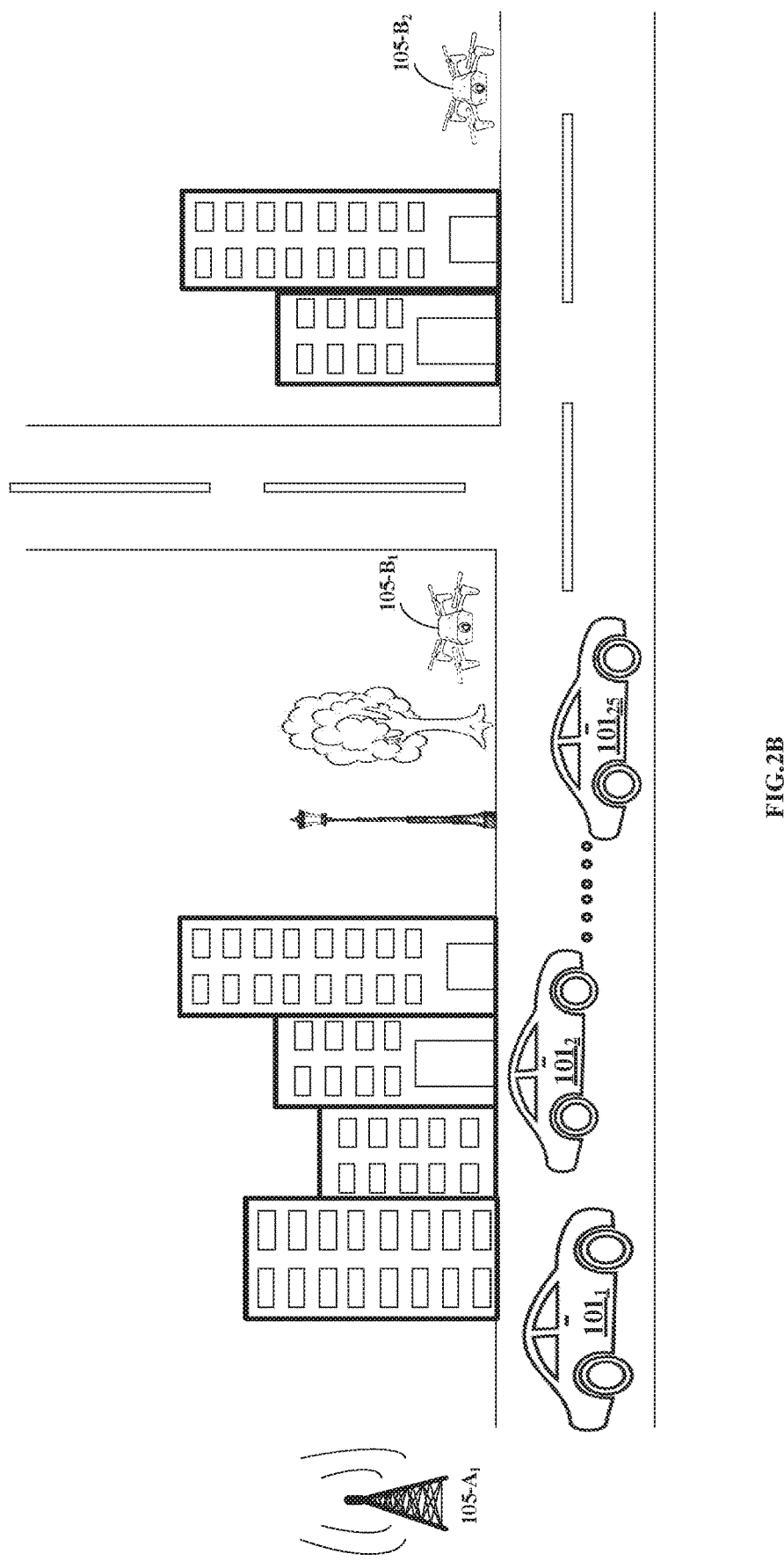
FIG. 2B-FIG. 2E show exemplary illustrations of router deployment in accordance with some embodiments of the present disclosure.

Consider an exemplary illustration as shown in the FIG. 2B, where a fixed router 105-$A_1$ is providing network access to vehicles stranded in a traffic signal. Consider the fixed router 105-$A_1$ has a bandwidth of 150 Mbps to 900 Mbps, and is capable of supporting upto an Internet Service Provider (ISP) connection speed of 75 Mbps. Further, in this scenario, the IoT devices present in each vehicle act as an input source 101. Therefore, for the sake of illustration, each vehicle is indicated as the input source 101$_1$, 101$_2$, 101$_3$, - - - 101$_{25}$ in the FIG. 2B.

Further, consider 25 vehicles (vehicle 101$_1$ to vehicle 101$_{25}$) are stranded in the traffic signal and the IoT devices present in each vehicle consume 3 Mbps to watch a video. In this scenario, the number of vehicles stranded in the traffic signal is high, and there exists only one fixed router 105-$A_1$ at a distance, that is capable of serving the network requirement of the IoT devices associated with the vehicles. Therefore, the vehicles may not get adequate bandwidth or signal strength or network connectivity which is required for watching the video at a data rate of 3 Mbps. Further, since there is only one fixed router 105-$A_1$ to serve the network requirement of each vehicle stranded in the signal, the sum of relevance factors of each input source 101 for the fixed router 105-A would be high. As an example, in this scenario, consider the sum of relevance factors of each input source is 0.9, which is close to 1. Further, when the router deployment system 103 predicts the intensity of the data traffic at the fixed router 105-$A_1$, consider the intensity of data traffic at the fixed router 105-$A_1$ exceeds the predefined load threshold. The router deployment system 103 therefore estimates that the fixed router 105-$A_1$ is overloaded and there is a need for relocating at least one portable router to reduce the network load on the fixed router 105-$A_1$. As shown in the FIG. 2B, there are two portable routers 105-$B_1$ and 105-$B_2$ located at two different points. As shown in the FIG. 2B, portable router 105-$B_1$ is proximal to the fixed router 105-$A_1$ when compared to the portable router 105-$B_2$. However, the specification of the portable router 105-$B_1$ is such that, it may not be able to handle the network requirement of the input sources 101 associated with the fixed router 105-$A_1$, but specification of the portable router 105-$B_2$ is capable of handling the network requirement of the input sources 101. Therefore, though the portable router 105-$B_1$ is closer to the fixed router 105-$A_1$ than the portable router 105-$B_2$, based on the specification, the router deployment system 103 selects the portable router 105-$B_2$ for the purpose of relocating.

Figure 2C:
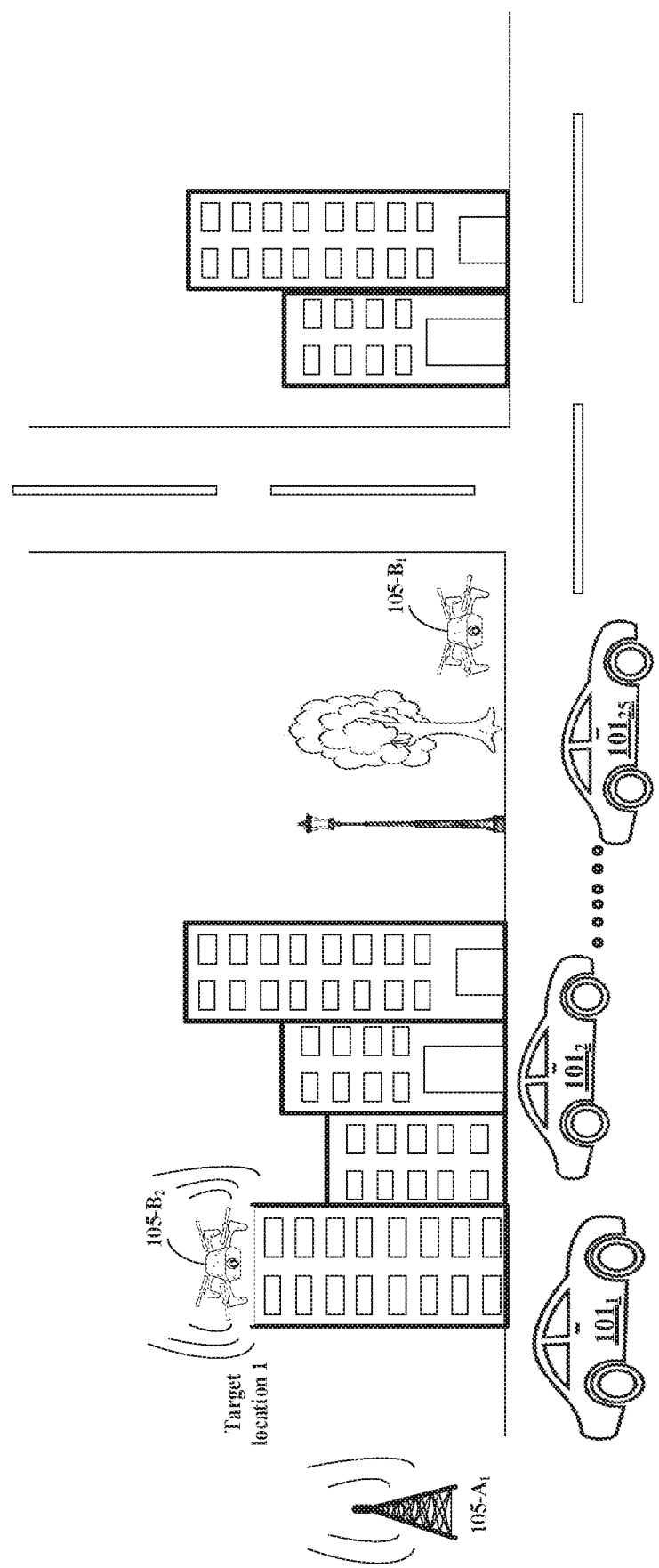

Upon selecting the portable router 105-$B_2$ for the purpose of relocating, the router deployment system 103 determines the target location 1 i.e. the location at which the portable router 105-$B_2$ is to be deployed after relocation and an optimal relocation path to reach the target location 1. Based on the previous learning, the router deployment system 103 detects a parking point on a building at the target location 1, where the portable router 105-$B_2$ can be deployed. Accordingly, the router deployment system 103 routes the portable router 105-$B_2$ to the target location 1 via the optimal relocation path and deploys the portable router 105-$B_2$ at the detected parking point, to share the network load of the fixed router 105-$A_1$ as shown in the FIG. 2C.

Figure 2D:
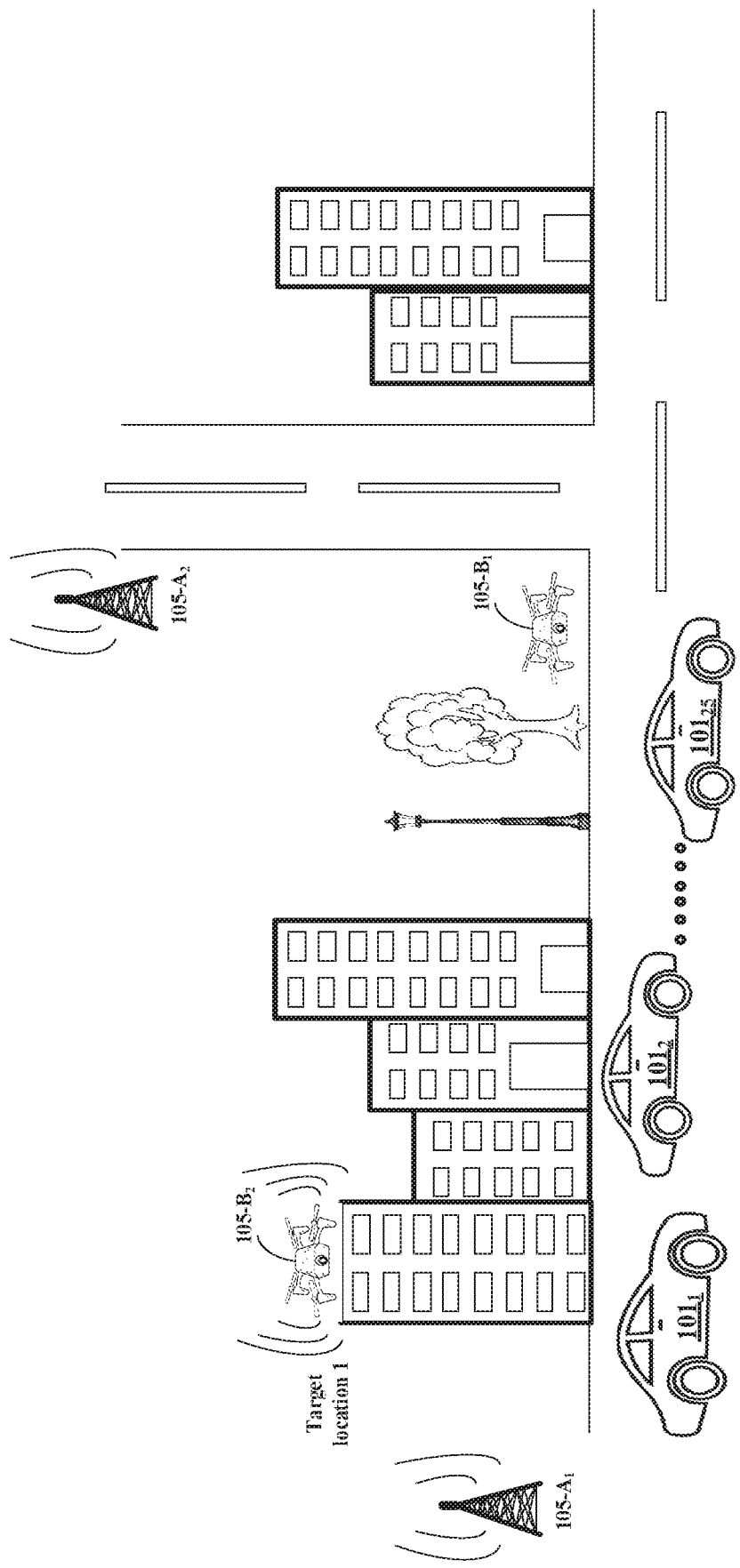
Figure 2E:
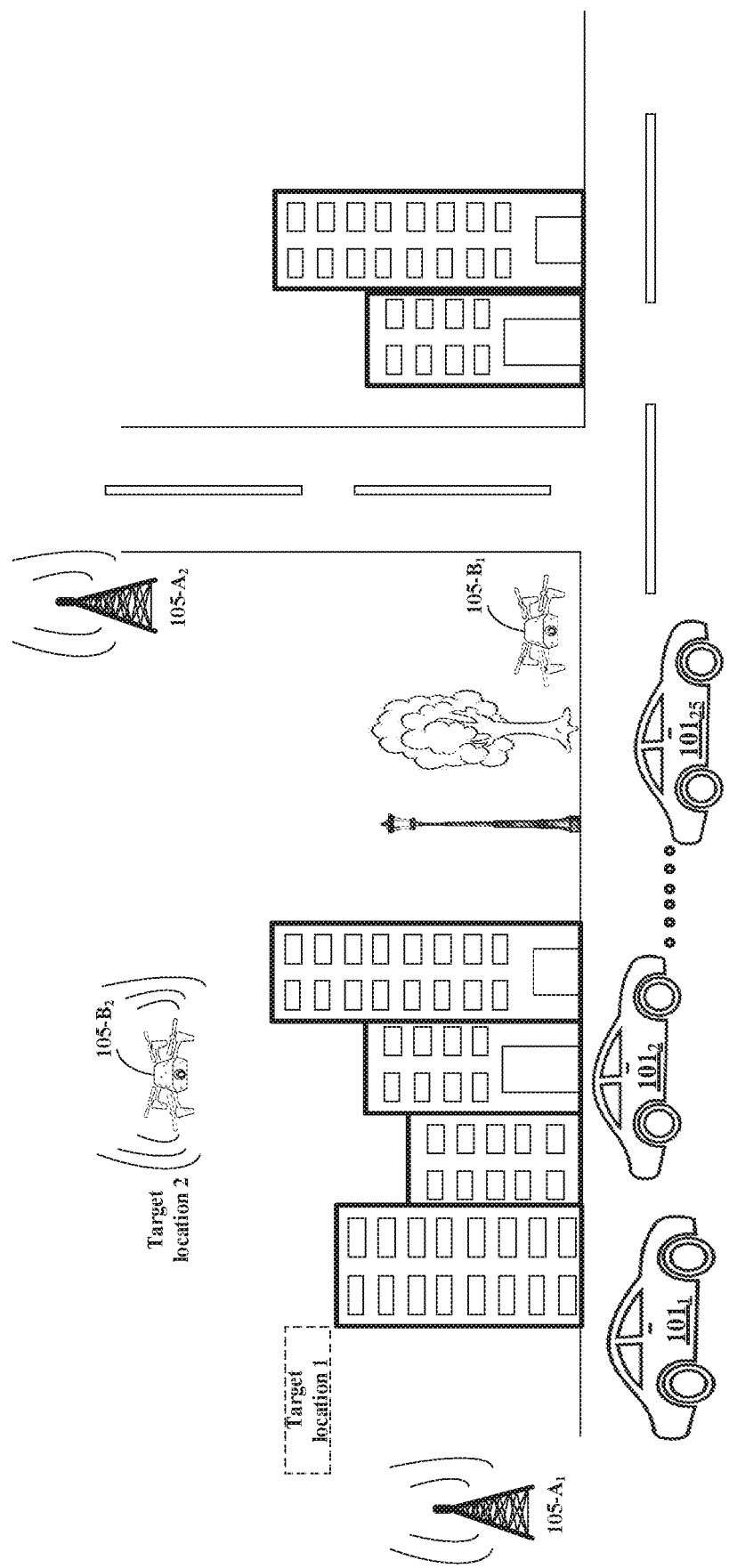

Further, consider a scenario, that after relocation as mentioned in above paragraph, the portable router 105-$B_2$ is proximal to another fixed router 105-$A_2$ which is overloaded, as shown in the FIG. 2D. Consider, the portable router 105-$B_2$ is under utilized and is capable of handling additional network load of the fixed router 105-$A_2$. In such scenarios, instead of relocating another portable router, the portable router 105-$B_2$ can be re-positioned in a manner that, the portable router 105-$B_2$ is able to share network load of both the fixed routers 105-$A_1$ and 105-$A_2$. Therefore, as shown in the FIG. 2E, the portable router 105-$B_2$ is repositioned from target location 1 to target location 2. Since, there is no parking point detected at the target location 2, the unmanned aerial vehicle comprising the portable router 105-$B_2$ hovers at the target location 2 to share the network load of both the fixed routers 105-$A_1$ and 105-$A_2$.

Figure 3:
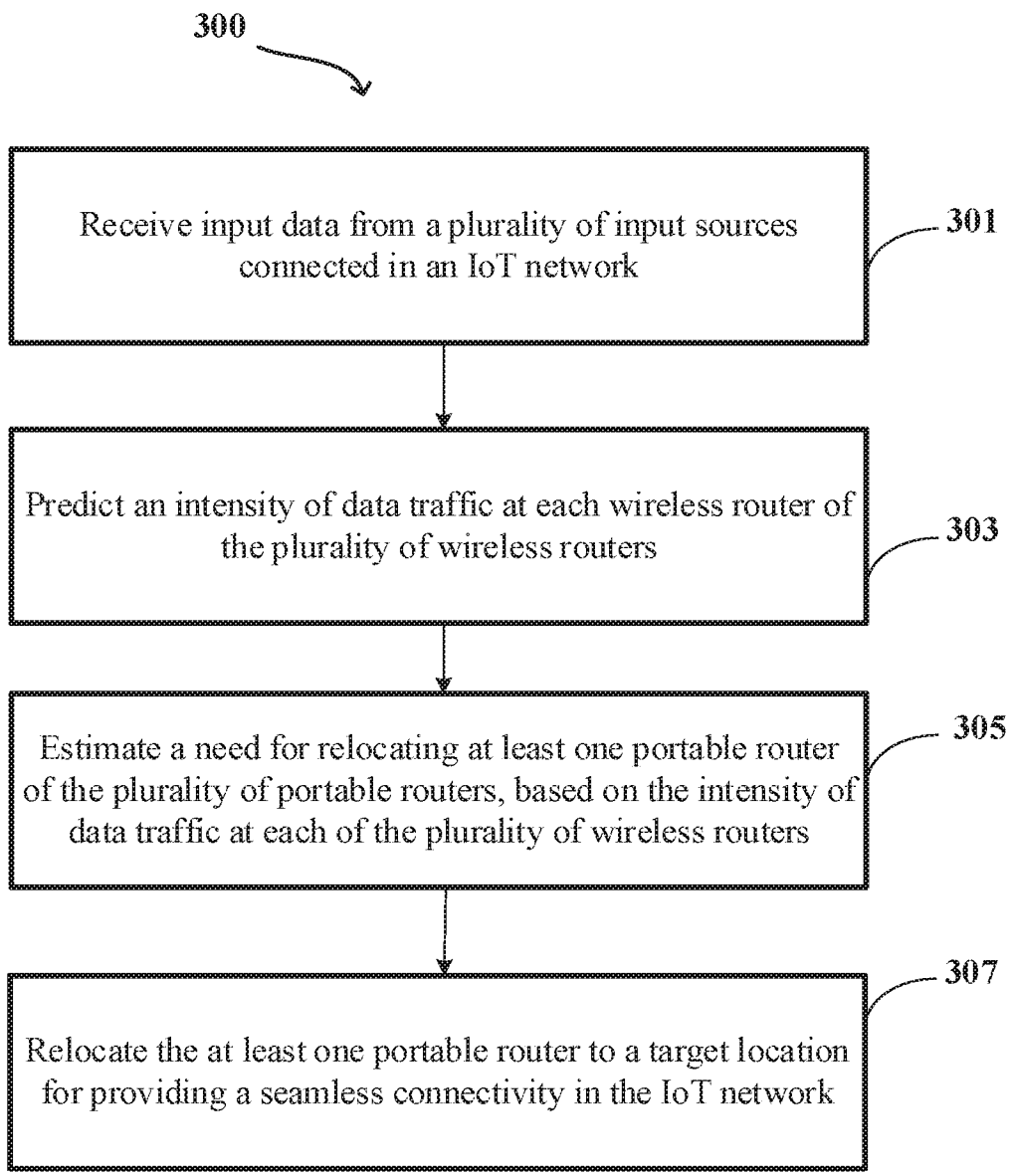
FIG. 3 shows a flowchart illustrating a method of providing seamless connectivity in an Internet of Things (IoT) network in accordance with some embodiments of the present disclosure.

FIG. 3 shows a flowchart illustrating a providing seamless connectivity in an Internet of Things (IoT) network in accordance with some embodiments of the present disclosure.

As illustrated in FIG. 3, the method 300 includes one or more blocks illustrating a method of providing seamless connectivity in an Internet of Things (IoT) network. The method 300 may be described in the general context of computer executable instructions. Generally, computer executable instructions can include routines, programs, objects, components, data structures, procedures, modules, and functions, which perform functions or implement abstract data types.

The order in which the method 300 is described is not intended to be construed as a limitation, and any number of the described method blocks can be combined in any order to implement the method 300. Additionally, individual blocks may be deleted from the methods without departing from the spirit and scope of the subject matter described herein. Furthermore, the method 300 can be implemented in any suitable hardware, software, firmware, or combination thereof.

At block 301, the method 300 may include receiving, by a processor 109 of the router deployment system 103, input data 207 from a plurality of input sources 101 connected in an IoT network. In some embodiments, the plurality of input sources 101 may include, but not limited to, a plurality of wireless routers 105 and a plurality of IoT devices 107. The plurality of wireless routers 105 may include, but not limited to, a plurality of fixed routers 105-A and a plurality of portable routers 105-B.

At block 303, the method 300 may include predicting, by the processor 109, an intensity of data traffic at each wireless router 105 of the plurality of wireless routers 105 based on total data to be directed by each wireless router 105, holding time of each of the plurality of input sources 101, a rate of arrival of data packets from each of the plurality of input sources 101, and unused buffer space of a buffer associated with each of the plurality of wireless routers 105. In some embodiments, the intensity of the data traffic is determined using one or more machine learning techniques. As an example, the one or more machines learning techniques may include, but not limited to, Long Short Term Memory (LSTM) techniques and Multilayer perceptron techniques.

At block 305, the method 300 may include, estimating, by the processor 109, a need for relocating at least one portable router 105-B of the plurality of portable routers 105-B, based on the intensity of data traffic at each of the plurality of wireless routers 105. In some embodiments, the processor 109 may estimate the need for relocating by estimating whether the intensity of data traffic at each of the plurality of wireless routers 105 exceeds at least one of a predefined load threshold and a predefined buffer filling rate threshold associated with each wireless router 105.

At block 307, the method 300 may include, relocating, by the processor 109, at least one portable router 105-B to a target location for providing a seamless connectivity in the IoT network. In some embodiments, the target location is determined based on a location of at least one wireless router 105 at which the intensity of data traffic exceeds at least the predefined load threshold and the predefined buffer filling rate threshold, and a location of each of the plurality of input sources 101 connected to the at least one wireless router 105. In some embodiments, the processor 109 may determine the at least one portable router 105-B to be relocated based on specification of the at least one portable router 105-B and a current location of the at least one portable router 105-B. Further, the processor 109 may determine an optimal relocation path for relocating the at least one portable router 105-B to the target location.

Figure 4:
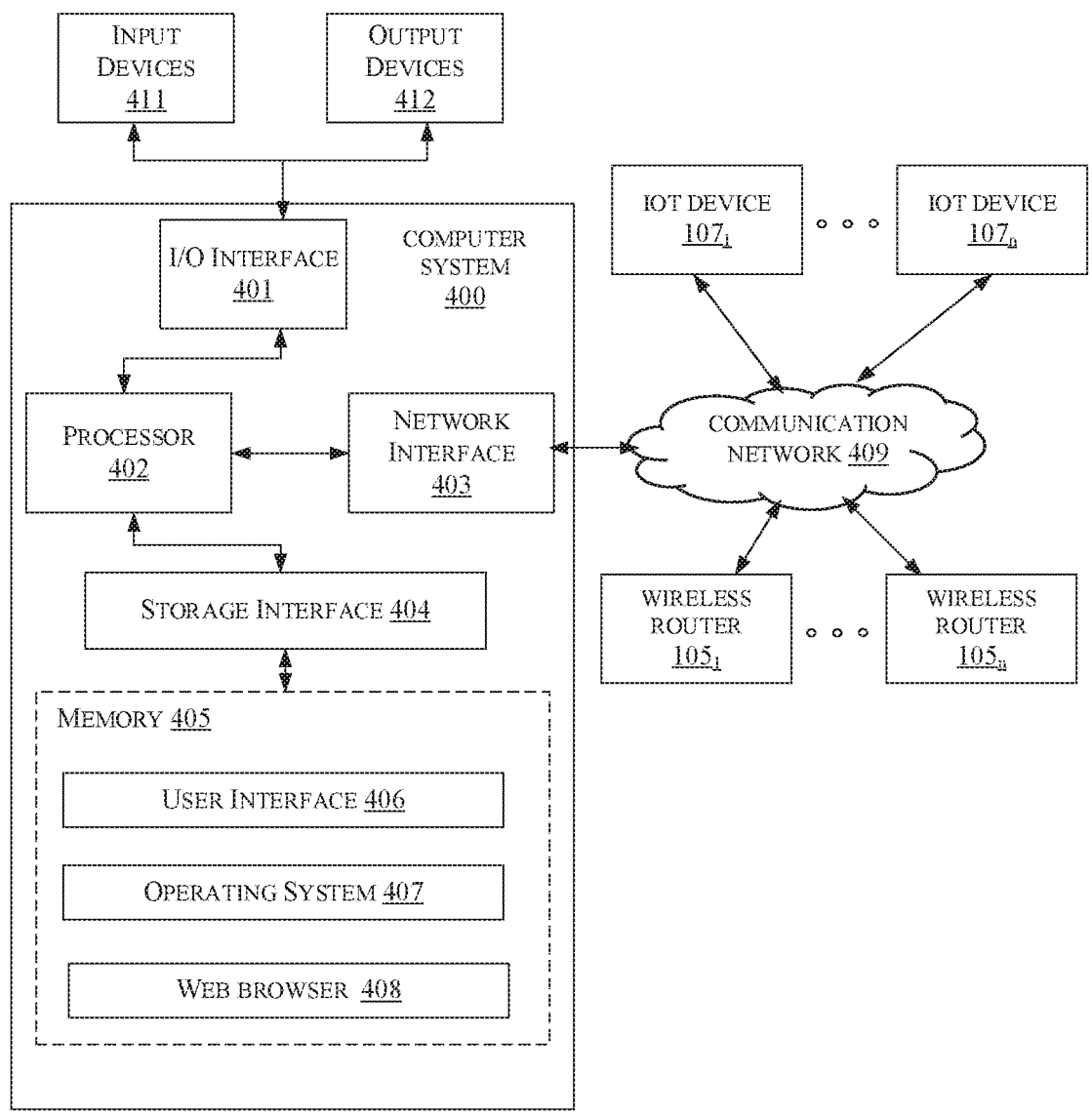
FIG. 4 is a block diagram of an exemplary computer system for implementing embodiments consistent with the present disclosure.

FIG. 4 is a block diagram of an exemplary computer system for implementing embodiments consistent with the present disclosure.

In some embodiments, FIG. 4 illustrates a block diagram of an exemplary computer system 400 for implementing embodiments consistent with the present invention. In some embodiments, the computer system 400 can be router deployment system 103 that is used for providing seamless connectivity in an Internet of Things (IoT) network. The computer system 400 may include a central processing unit ("CPU" or "processor") 402. The processor 402 may include at least one data processor for executing program components for executing user or system-generated business processes. A user may include a person, a person using a device such as those included in this invention, or such a device itself. The processor 402 may include specialized processing units such as integrated system (bus) controllers, memory management control units, floating point units, graphics processing units, digital signal processing units, etc.

The processor 402 may be disposed in communication with input devices 411 and output devices 412 via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n /b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, computer system 400 may communicate with input devices 411 and output devices 412.

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with a wireless router $105_1$ to a wireless router $105_n$ (also referred as a plurality of wireless routers 105) and an IoT device $107_1$ to an IoT device $107_n$ (also referred as a plurality of IoT devices 107). Further, the communication network 409 can be implemented as one of the different types of networks, such as intranet or Local Area Network (LAN), Closed Area Network (CAN) and such within the autonomous vehicle. The communication network 409 may either be a dedicated network or a shared network, which represents an association of the different types of networks that use a variety of protocols, for example, Hypertext Transfer Protocol (HTTP), CAN Protocol, Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, a user interface 406, an operating system 407, a web browser 408 etc. In some embodiments, the computer system 400 may store user/application data, such as the data, variables, records, etc. as described in this invention. Such databases may be implemented as fault-tolerant, relational, scalable, secure databases such as Oracle or Sybase.

The operating system 407 may facilitate resource management and operation of the computer system 400. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA/7/8, 10 etc.), APPLE® IOS®, GOOGLE™ ANDROID™, BLACK-BERRY® OS, or the like. The User interface 406 may facilitate display, execution, interaction, manipulation, or operation of program components through textual or graphical facilities. For example, user interfaces may provide computer interaction interface elements on a display system operatively connected to the computer system 400, such as cursors, icons, checkboxes, menus, scrollers, windows, widgets, etc. Graphical User Interfaces (GUIs) may be employed, including, without limitation, Apple® Macintosh® operating systems' Aqua®, IBM® OS/2®, Microsoft® Windows® (e.g., Aero, Metro, etc.), web interface libraries (e.g., ActiveX®, Java®, Javascript®, AJAX, HTML, Adobe® Flash®, etc.), or the like.

In some embodiments, the computer system 400 may implement the web browser 408 stored program components. The web browser 408 may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers 408 may utilize facilities such as AJAX, DHTML, ADOBE® FLASH®, JAVASCRIPT®, JAVA®, Application Programming Interfaces (APIs), etc. In some embodiments, the computer system 400 may implement a mail server stored program component. The mail server may be an Internet mail server such as Microsoft Exchange, or the like. The mail server may utilize facilities such as Active Server Pages (ASP), ACTIVEX®, ANSI® C++/C #, MICROSOFT®, .NET, CGI SCRIPTS, JAVA®, JAVASCRIPT®, PERL PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 400 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

The present disclosure provides a method and a system for providing seamless connectivity in an Internet of Things (IoT) network.

The present disclosure ensures balanced utilization of the network resources by dynamically deploying portable routers, as per requirement, which in turn eliminates the over utilization or under utilization of the fixed or other portable routers.

The dynamic deployment of the portable routers in the present disclosure is based on the intensity of data traffic at each of the wireless routers, which in turn helps in accounting for dynamic concentration of IoT devices in a certain location, requiring network access.

The present disclosure caters to the real-time networking requirements of the IoT devices.

Additionally, the present disclosure predicts the intensity of data traffic at each of the wireless routers, based on current input data. This type of prediction enables futuristic decision making related to dynamic deployment of portable routers, to adaptively manage the load on the wireless routers, in real-time.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for providing seamless connectivity in an IoT network. The illustrated steps are set out to explain the exemplary embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

| Referral numerals | |
|---|---|
| Reference Number | Description |
| 100 | Architecture |
| 101 | Plurality of input sources |
| 103 | Router deployment system |
| 105 | Plurality of wireless routers |
| 107 | Plurality of IoT devices |
| 109 | Processor |
| 111 | I/O interface |
| 113 | Memory |
| 203 | Data |
| 205 | Modules |
| 207 | Input data |
| 209 | Predicted data |
| 211 | Relocation data |
| 213 | Other data |
| 221 | Receiving module |
| 223 | Intensity predicting module |
| 225 | Estimating module |
| 227 | Relocating module |
| 229 | Router movement module |
| 231 | Learning module |
| 233 | Other modules |
| 400 | Exemplary computer system |
| 401 | I/O Interface of the exemplary computer system |
| 402 | Processor of the exemplary computer system |
| 403 | Network interface |
| 404 | Storage interface |
| 405 | Memory of the exemplary computer system |
| 406 | User interface |
| 407 | Operating system |
| 408 | Web browser |
| 409 | Communication network |
| 411 | Input devices |
| 412 | Output devices |

What is claimed is:

1. A method of providing seamless connectivity in an Internet of Things (IoT) network, the method comprising:
receiving, by a router deployment system, input data from a plurality of input sources connected in an IoT network, wherein the plurality of input sources comprises at least one of a plurality of wireless routers and a plurality of IoT devices, wherein the plurality of wireless routers comprises at least one of a plurality of fixed routers and a plurality of portable routers;
predicting, by the router deployment system, an intensity of data traffic at each wireless router of the plurality of wireless routers based on total data to be directed by each wireless router, holding time of each of the plurality of input sources, a rate of arrival of data packets from each of the plurality of input sources, and unused buffer space of a buffer associated with each of the plurality of wireless routers;
estimating, by the router deployment system, a need for relocating at least one portable router of the plurality of portable routers, based on the intensity of data traffic at each of the plurality of wireless routers; and
relocating, by the router deployment system, the at least one portable router to a target location for providing a seamless connectivity in the IoT network, wherein the target location is determined based on a location of at least one wireless router at which the intensity of data traffic exceeds at least one of a predefined load threshold and a predefined buffer filling rate threshold, and a location of each of the plurality of input sources connected to the at least one wireless router,
wherein the at least one portable router is relocated to the target location through an unmanned aerial vehicle, and wherein the at least one portable router is at least one of detachably attached to or is configured with the unmanned aerial vehicle.

2. The method as claimed in claim 1, wherein the input data comprises at least one of status of the buffer associated with each of the plurality of wireless routers at a given time instance, rate of filling of the buffer associated with each of the plurality of wireless routers, number of the plurality of input sources directing data through each of the plurality of wireless routers, holding time of each of the plurality of input sources, data rate corresponding to each of the plurality of input sources and size of data transmitted by each of the plurality of input sources.

3. The method as claimed in claim 1, wherein estimating the need for relocating the at least one portable router comprises
estimating whether the intensity of data traffic at each of the plurality of wireless routers exceeds at least one of the predefined load threshold and the predefined buffer filling rate threshold associated with each wireless router.

4. The method as claimed in claim 1, wherein the at least one portable router to be relocated is determined based on specification of the at least one portable router, and a current location of the at least one portable router.

5. The method as claimed in claim 1 further comprises determining, by the router deployment system, an optimal relocation path for relocating the at least one portable router to the target location.

6. The method as claimed in claim 1, wherein the intensity of data traffic is predicted using one or more machine learning techniques, wherein the prediction is at least one of a location-wise prediction and a time-wise prediction.

7. The method as claimed in claim 1 further comprises initiating, by the router deployment system, a self-learning process based on each relocation, wherein the self-learning process is related to deployment of the plurality of portable routers.

8. A router deployment system for providing seamless connectivity in an Internet of Things (IoT) network, the router deployment system comprises:
   a processor; and
   a memory communicatively coupled to the processor, wherein the memory stores the processor-executable instructions, which, on execution, causes the processor to:
   receive input data from a plurality of input sources connected in an IoT network, wherein the plurality of input sources comprises at least one of a plurality of wireless routers and a plurality of IoT devices, wherein the plurality of wireless routers comprises at least one of a plurality of fixed routers and a plurality of portable routers;
   predict an intensity of data traffic at each wireless router of the plurality of wireless routers based on total data to be directed by each wireless router, holding time of each of the plurality of input sources, a rate of arrival of data packets from each of the plurality of input sources, and unused buffer space of a buffer associated with each of the plurality of wireless routers;
   estimate a need for relocating at least one portable router of the plurality of portable routers, based on the intensity of data traffic at each of the plurality of wireless routers; and
   relocate the at least one portable router to a target location for providing a seamless connectivity in the IoT network, wherein the target location is determined based on a location of at least one wireless router at which the intensity of data traffic exceeds at least one of a predefined load threshold and a predefined buffer filling rate threshold, and a location of each of the plurality of input sources connected to the at least one wireless router,
   wherein the at least one portable router is relocated to the target location through an unmanned aerial vehicle, and wherein the at least one portable router is at least one of detachably attached to or is configured with the unmanned aerial vehicle.

9. The router deployment system as claimed in claim 8, wherein the input data comprises at least one of status of the buffer associated with each of the plurality of wireless routers at a given time instance, rate of filling of the buffer associated with each of the plurality of wireless routers, number of the plurality of input sources directing data through each of the plurality of wireless routers, holding time of each of the plurality of input sources, data rate corresponding to each of the plurality of input sources and size of data transmitted by each of the plurality of input sources.

10. The router deployment system as claimed in claim 8, wherein to estimate the need for relocating the at least one portable router, the processor is configured to:
   estimate whether the intensity of data traffic at each of the plurality of wireless routers exceeds at least one of the predefined load threshold and the predefined buffer filling rate threshold associated with each wireless router.

11. The router deployment system as claimed in claim 8, wherein the processor determines the at least one portable router to be relocated based on specification of the at least one portable router and a current location of the at least one portable router.

12. The router deployment system as claimed in claim 8, wherein the processor is further configured to determine an optimal relocation path for relocating the at least one portable router to the target location.

13. The router deployment system as claimed in claim 8, wherein the processor predicts the intensity of data traffic using one or more machine learning techniques, wherein the prediction is at least one of a location-wise prediction and a time-wise prediction.

14. The router deployment system as claimed in claim 8, wherein the processor is further configured to initiate a self-learning process based on each relocation, wherein the self-learning process is related to deployment of the plurality of portable routers.

15. A non-transitory computer readable medium including instructions stored thereon that when processed by at least one processor causes a router deployment system to perform operations comprising:
   receiving input data from a plurality of input sources connected in an IoT network, wherein the plurality of input sources comprises at least one of a plurality of wireless routers and a plurality of IoT devices, wherein the plurality of wireless routers comprises at least one of a plurality of fixed routers and a plurality of portable routers;
   predicting an intensity of data traffic at each wireless router of the plurality of wireless routers based on total data to be directed by each wireless router, holding time of each of the plurality of input sources, a rate of arrival of data packets from each of the plurality of input sources, and unused buffer space of a buffer associated with each of the plurality of wireless routers;
   estimating a need for relocating at least one portable router of the plurality of portable routers, based on the intensity of data traffic at each of the plurality of wireless routers; and
   relocating the at least one portable router to a target location for providing a seamless connectivity in the IoT network, wherein the target location is determined based on a location of at least one wireless router at which the intensity of data traffic exceeds at least one of a predefined load threshold and a predefined buffer filling rate threshold, and a location of each of the plurality of input sources connected to the at least one wireless router,
   wherein the at least one portable router is relocated to the target location through an unmanned aerial vehicle, and wherein the at least one portable router is at least one of detachably attached to or is configured with the unmanned aerial vehicle.

\* \* \* \* \*